US012689920B2

(12) United States Patent
Sáfár et al.

(10) Patent No.: US 12,689,920 B2
(45) Date of Patent: Jul. 21, 2026

(54) WIRELESS COMMUNICATION NETWORK VOICE QUALITY MONITORING

(71) Applicant: Telefonaktiebolaget LM Ericsson (publ), Stockholm (SE)

(72) Inventors: Orsolya Sáfár, Budapest (HU); Attila Brájer, Budapest (HU); Attila Mitcsenkov, Budapest (HU)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 312 days.

(21) Appl. No.: 18/288,466

(22) PCT Filed: May 10, 2021

(86) PCT No.: PCT/IB2021/053963
§ 371 (c)(1),
(2) Date: Oct. 26, 2023

(87) PCT Pub. No.: WO2022/238729
PCT Pub. Date: Nov. 17, 2022

(65) Prior Publication Data
US 2024/0214844 A1    Jun. 27, 2024

(51) Int. Cl.
*H04W 24/08* (2009.01)
*H04L 41/16* (2022.01)
(Continued)

(52) U.S. Cl.
CPC ............. *H04W 24/08* (2013.01); *H04L 41/16* (2013.01); *H04L 41/5067* (2013.01); *H04L 43/08* (2013.01); *H04W 24/02* (2013.01)

(58) Field of Classification Search
CPC ...... H04W 24/08; H04W 24/02; H04L 41/16; H04L 41/5067; H04L 43/08
See application file for complete search history.

(56) References Cited

U.S. PATENT DOCUMENTS

| | | | |
|---|---|---|---|
| 2018/0204129 A1* | 7/2018 | Vasseur | G06N 20/00 |
| 2019/0132757 A1* | 5/2019 | Tapia | H04W 24/08 |

(Continued)

FOREIGN PATENT DOCUMENTS

| | | |
|---|---|---|
| WO | 2017216097 A1 | 12/2017 |
| WO | 2018036621 A1 | 3/2018 |

(Continued)

OTHER PUBLICATIONS

International Telecommunication Union, "Series P: Telephone Transmission Quality, Telephone Installations, Local Line Networks", ITU-T P.863, Telecommunication Standardization Sector of ITU, P Series Recommendations, Mar. 2018, pp. 1-80, ITU-T.

*Primary Examiner* — Angela Widhalm De Rodriguez
(74) *Attorney, Agent, or Firm* — COATS & BENNETT, PLLC

(57) ABSTRACT

In voice communication quality monitoring, both user plane and control plane signaling are gathered during network operation, and correlated. Offline (that is, not in real time), a predictive machine learning model is trained using the signaling data. The model is subsequently used to monitor network operation in real time. The model label is instances of voice quality degradation gleaned from probing the user plane media. The are control plane traffic patterns correlated to the voice quality degradation incidents. After training, when monitoring voice quality in real time on the network, only the control plane signaling is monitored. The machine learning model recognizes learned control plane signaling patterns and infers corresponding user plane voice quality degradation incidents. Settings of the model are controlled to achieve a desired precision/recall tradeoff. Because only control plane signaling is monitored in real time, the approach can be applied across all voice communications in a network (or portion of a network). The machine learning (Continued)

model is re-trained as necessary to reflect changes in the network.

20 Claims, 6 Drawing Sheets

(51) Int. Cl.
 *H04L 41/5067* (2022.01)
 *H04L 43/08* (2022.01)
 *H04W 24/02* (2009.01)

(56) References Cited

U.S. PATENT DOCUMENTS

2020/0177662 A1* 6/2020 Gupta ..................... H04L 43/08
2020/0366699 A1* 11/2020 Sampaio ........... G06F 16/24568

FOREIGN PATENT DOCUMENTS

WO      2020014579 A1    1/2020
WO   WO-2020142407 A1 *  7/2020   ............. H04L 43/08
WO      2020259831 A1    12/2020

* cited by examiner

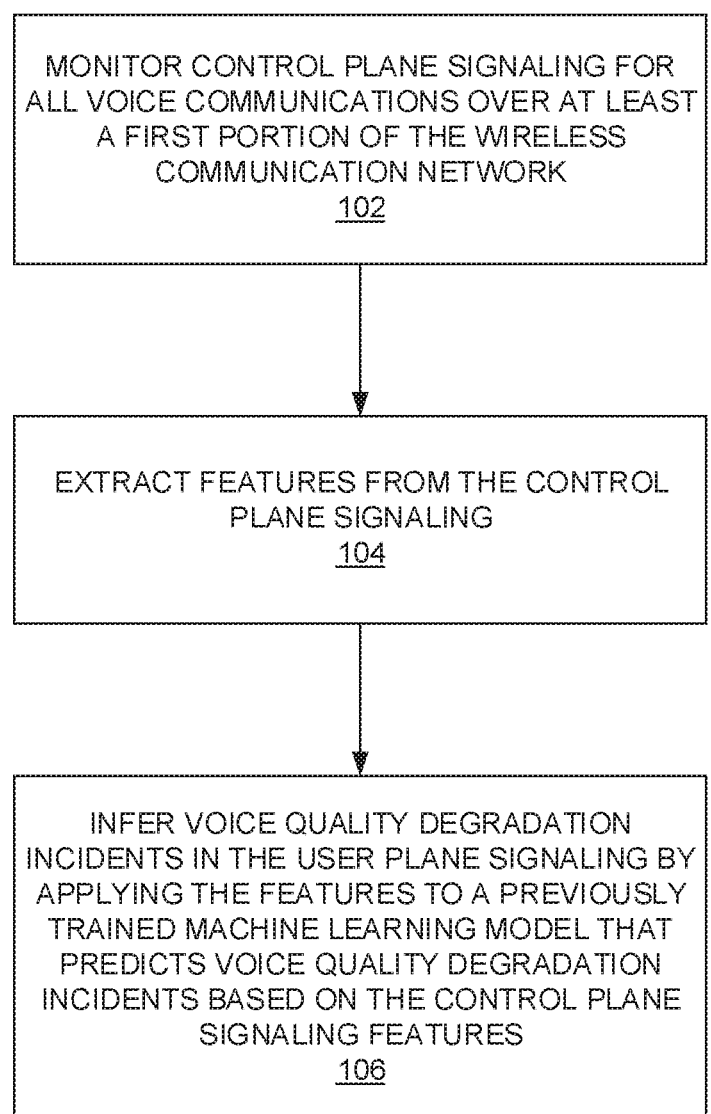

MONITOR CONTROL PLANE SIGNALING FOR
ALL VOICE COMMUNICATIONS OVER AT LEAST
A FIRST PORTION OF THE WIRELESS
COMMUNICATION NETWORK
102

EXTRACT FEATURES FROM THE CONTROL
PLANE SIGNALING
104

INFER VOICE QUALITY DEGRADATION
INCIDENTS IN THE USER PLANE SIGNALING BY
APPLYING THE FEATURES TO A PREVIOUSLY
TRAINED MACHINE LEARNING MODEL THAT
PREDICTS VOICE QUALITY DEGRADATION
INCIDENTS BASED ON THE CONTROL PLANE
SIGNALING FEATURES
106

Figure 5

WIRELESS COMMUNICATION NETWORK VOICE QUALITY MONITORING

TECHNICAL FIELD

The present invention relates generally to wireless communication networks, and in particular to a voice quality monitoring system and method having limited user plane probing.

BACKGROUND

Wireless communication networks are ubiquitous in many parts of the world. These networks continue to grow in capacity and sophistication. To accommodate both more users and a wider range of types of devices that may benefit from wireless communications, the technical standards governing the operation of wireless communication networks continue to evolve. The fourth generation of network standards has been deployed (4G, also known as Long Term Evolution, or LTE), the fifth generation is in development and being deployed in some markets (5G, also known as New Radio, or NR), and the sixth generation (6G) is being planned. Modern wireless communication network architectures separate user plane media—the data sent to and from subscribers—from control plane signaling, which comprises the "overhead" of control data used to operate, monitor, and manage the network. Network nodes and communication links may be dedicated largely or wholly to one or the other plane of service, although the user and control planes also necessarily share some nodes and links (e.g., across the air interface of a Radio Access Network, or RAN). FIG. 1 depicts this separation, where solid lines indicate user plane links and dotted lines denote control plane links.

Modern wireless communication networks transmit vast amounts of user plane data, comprising text, images, music, email, streaming video, process monitoring and control data, real-time data such as autonomous vehicle control, and many other types, as well as voice communications. All modern wireless communication networks are descended from analog, circuit-switched voice telephony networks, and voice communications remains a primary use case for subscribers today. Voice audio (also referred to as speech) is digitized and transferred on packet-switched networks, in services known as Voice-over-Internet-Protocol (VoIP), Voice-over-LTE (VoLTE) and Voice-over-NR (VoNR).

The subjective quality of voice communication is an important factor in subscriber satisfaction, and Service Level Agreements (SLAs) often include specifications stipulating minimum permissible quality levels of voice communications that must be maintained. The primary metric for voice Quality of Experience (QoE) is the Mean Opinion Score (MOS), which quantifies voice quality along a scale of [1.0, 5.0]. MOS values were originally derived by averaging a number of subjective scores assigned by human test listeners. However, algorithms now assess voice quality. The most common MOS estimation methodology is the Perceptual Objective Listening Quality Analysis (POLQA) testing standard, defined in recommendation P.863 of the International Telecommunication Union Telecommunication Standardization Sector (IUT-T). Other methods of assessing voice quality are also known and widely used.

There exist several different approaches for assessing and monitoring voice quality in wireless communication networks, all of which present challenges.

First, end-to-end correlated, advanced analytic tools, such as Ericsson Expert Analytics (EEA), apply probing systems that cover all of the user plane traffic in a network (or at least, IP Multimedia Subsystem, or IMS, user plane traffic). Processing and analyzing Real-time Transport Protocol (RTP) packet streams reveals voice quality issues, both for quantitative Quality of Service (QoS) metrics, such as packet losses, delay variations, and the like, and qualitative Quality of Experience (QoE) metrics, such as muting/garbling voice issues, voice MOS, and the like. However, full coverage user plane probing is challenging due to the need for the monitoring hardware footprint to grow with the traffic and complexity of mobile networks. Additionally, some changes in the 5G architecture prevent external probing systems being deployed in the user plane traffic directly. Meanwhile, built-in software probing solutions do not provide full coverage of the user plane traffic.

Second, to address the need for massive resources, a constrained version of such advanced analytics may be applied, wherein only a random or focused subset of calls/sessions, packets, or the like is analyzed. While this approach may relax the hardware requirements, a significant part of the network traffic, users, and/or locations (depending on the filtering options) are hidden from the analysis. Extrapolation from the sampled traffic yields a reasonably accurate indication of overall voice quality statistics for the total traffic, but the data are less reliable for troubleshooting and root cause analysis purposes.

Third, RAN analytics tools applied to Cell Trace Records (CTR) yield in-depth information on radio QoS metrics, such as frame loss, from which voice QoE can be inferred. However, these tools do not measure voice integrity Key Performance Indicators (KPI) directly, as such information is not visible from the RAN, and hence is not present in CTRs. Furthermore, a core design goal of modern, multi-layered telecommunication networks is robustness—delivering higher layer services at high quality even in the face of degradation of lower level functionality. Attempting to estimate voice quality directly from low-level CTR data thus operates against this principle.

Fourth, core network control plane analytics tools estimate the quality of voice, video, and other media delivery using signaling of core network nodes (including IMS) following the call setup and termination procedures, and some intermittent signaling events during the call. While this approach is typically less resource intensive than user plane monitoring, and hence it can even be done in real time, it does not cover the user plane traffic itself. Accordingly, core network control plane analytics cannot generate user plane voice quality KPIs.

Finally, Performance Management (PM) tools rely on node-generated statistics to monitor network performance on both the control and user planes. However, the tools are limited to high level views, and the aggregated statistics are generated per Reporting Out Period (ROP), which is 5-15 minutes. This enables the detection of serious problems impacting a majority of subscribers over a longer timeframe, but does not support separation of sessions by various dimensions. PM tools thus cannot achieve a resolution high enough to detect short term temporary issues, or problems specific to a subset of users, services, or terminals, which is the typical quality degradation mode for most network issues, other than the most serious ones.

Accordingly, no analytical tools known in the art can effectively monitor the quality of voice communications in modern wireless communication networks. User plane traffic is too voluminous to monitor directly, and monitoring only samples of it does not yield the detailed data necessary for troubleshooting. Similarly, PM tools operate at a network-wide level and lack the required resolution. CTR and core network control plane data are useful, and computationally tractable, but do not yield actual user plane voice quality KPIs. Thus, the ability to monitor ongoing voice communication quality and detect incidents of voice quality degradation, with enough precision and specificity to act on the information, with a reasonable hardware footprint, stands as an ongoing challenge of modern wireless communication network design and operation.

The Background section of this document is provided to place embodiments of the present invention in technological and operational context, to assist those of skill in the art in understanding their scope and utility. Approaches described in the Background section could be pursued, but are not necessarily approaches that have been previously conceived or pursued. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

Embodiments of the present invention described and claimed herein provide a trade-off between full user plane voice traffic probing, which provides the richest quality data but has impractical hardware requirements, and monitoring only control plane traffic, which is feasible but yields insufficiently detailed voice quality data. Both user plane and control plane signaling are gathered during network operation, and correlated. Offline (that is, not in real time), a predictive machine learning model is trained using the signaling data. The model is subsequently used to monitor network operation in real time. The model label—the quantity the model will predict in use—is instances of voice quality degradation gleaned from probing the user plane media. The features—which is the data input to the model in use—are control plane traffic patterns correlated to the voice quality degradation incidents. Because the predictive machine learning model is trained offline, the computational complexity of user plane probing is not an obstacle. After training, when monitoring voice quality in real time on the network, only the control plane signaling is monitored. The machine learning model recognizes learned control plane signaling patterns and infers corresponding user plane voice quality degradation incidents. Because control plane monitoring is a less resource intensive analytics operation than user plane probing, embodiments of the present invention are easily extended to full coverage, i.e., all subscribers and all sessions. Settings of the model are controlled to achieve a desired precision/recall tradeoff. With a high recall, the model will accurately infer a large proportion of actual voice quality degradation incidents; however, high recall reduces precision, meaning the model will also infer more "false positive" incidents.

One embodiment relates to a method of monitoring voice quality in a wireless communication network implemented with separate user plane and control plane architectures. In real time, as voice communications are transmitted through the network, control plane signaling for all voice communications over at least a first portion of the wireless communication network is monitored. Features are extracted from the control plane signaling. Voice quality degradation incidents in the user plane media are inferred by applying the features to a previously trained machine learning model that predicts voice quality degradation incidents based on the control plane signaling features.

Another embodiment relates to a computational resource communicatively coupled to a wireless communication network implemented with separate user plane and control plane architectures, and operative to monitor voice communications in the wireless communication network. The computational resource includes communication circuitry and processing circuitry operatively coupled to the communication circuitry. The processing circuitry is configured to, in real time as voice communications are transmitted through the network, monitor control plane signaling for all voice communications over at least a first portion of the wireless communication network; extract features from the control plane signaling; and infer voice quality degradation incidents in the user plane media by applying the features to a previously trained machine learning model that predicts voice quality degradation incidents based on the control plane signaling features.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

FIG. 2 is a timeline showing the division of a voice communication into bins and windows.

FIG. 5 is a flow diagram of a method of voice quality monitoring.

DETAILED DESCRIPTION

For simplicity and illustrative purposes, the present invention is described by referring mainly to an exemplary embodiment thereof. In the following description, numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention.

Overview

Figure 1:
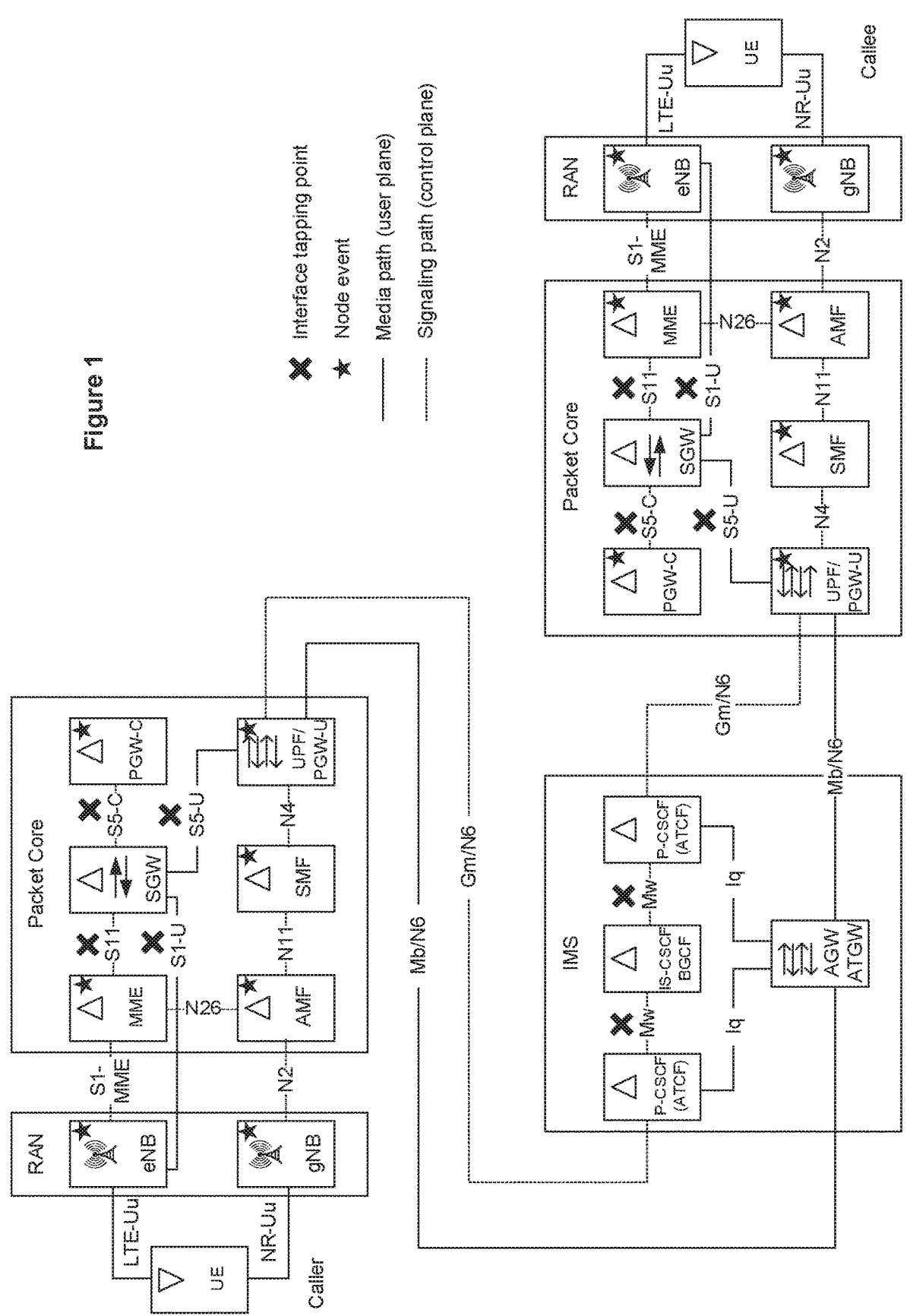
FIG. 1 is an end-to-end network diagram of a wireless communication network, showing network monitoring points.

FIG. 1 is a block diagram showing representative nodes and links of wireless communication networks that may be involved in an end-to-end voice call, or session (referred to herein as a voice communication) between two users. Both the caller and callee interact with User Equipment (UE), such as a smartphone. As well known in the art, the network may be logically divided into a Radio Access Network (RAN), which provides wireless communication between UEs and core network nodes. The Packet Core includes network nodes hosting functions such as Service, Access, and Mobility Management, gateways to other networks, and the like. Voice calls may be connected between wireless network cores via an IP Multimedia System (IMS). Wireless communication networks, such as 4G/LTE and 5G/NR are well documented in 3GPP standards, and the structure and operation of the network is not further described herein.

FIG. 1 indicates the interfaces, or links, dedicated to user plane media by solid lines connecting nodes, and indicates the control plane signaling paths by dotted lines. FIG. 1 identifies nodes and interfaces, with star and "x" icons, respectively, that can be monitored or probed to obtain network signaling.

Control plane signaling may refer to IMS signaling, known as Session Initiation Protocol (SIP), for IMS nodes and links. Wireless network packet core signaling—the control plane GPRS Tunnelling Protocol (GTP-C) for 4G/LTE, or HyperText Transfer Protocol v2.0 (HTTP2) and Packet Forwarding Control Protocol (PFCP) for 5G/NR—is the source of control plane signaling in the core networks. Cell Trace Records (CTR) collect control plane signaling data in the RAN. Any of these sources of control plane signaling may be utilized, and indeed all of them, including combinations thereof, have been tested and provide similarly reliable results.

Probing of user plane media comprises analysis of the Real-time Transfer Protocol (RTP) flow (voice media) of a VoIP/VoLTE/VoNR call. The RTP flow may be captured in the IMS domain, such as at a media gateway, or in the wireless network packet core. Voice quality degradation incidents are detected from characteristics of the RTP media flow. These incidents are time-correlated with control plane events or signaling patterns, including IMS SIP signaling, packet core signaling, and/or CTR data.

Both user plane and control plane signaling are collected during actual voice communications in a network and correlated, such as by using timestamps, packet sequence numbers, and other network timing events or data. This full, correlated data set is analyzed offline, to extract labels and corresponding features for training a predictive machine learning algorithm.

Labels: Voice Quality Degradation Incidents

Voice quality is determined from RTP media flow analysis. To respect user privacy, voice packet payloads are not processed—only packet header and control plane information is analyzed. This nonetheless enables in-depth voice quality analysis.

By analyzing sequence numbers and timestamps, packet delivery anomalies are detected. These include out-of-order delivery, packet losses, late losses, jitter, and delay conditions. These packet delivery anomalies are sufficient to detect poor voice quality, such as garbling, sizzling, etc., as shorter sequence jumps during the voice communication in the RTP stream, causing disturbances in the voice being played out from the buffer of the terminal. Muted voice is indicated by long burst losses in the RTP stream, causing temporary gaps in voice play-out. Parameter based MOS estimation models are possible by combining the RTP flow information with the codec used (IMS control plane).

The "label" of a predictive machine learning algorithm corresponds to the target variable. According to embodiments of the present invention, the garbling and muted voice events detected by RTP flow analysis—referred to herein as "voice quality degradation incidents"—are labels for training a machine learning model. Because they are bound to a short sequence of RTP packets, they provide accurate timing of the events, which helps to identify the concurrent control plane signaling patterns.

Figure 2:
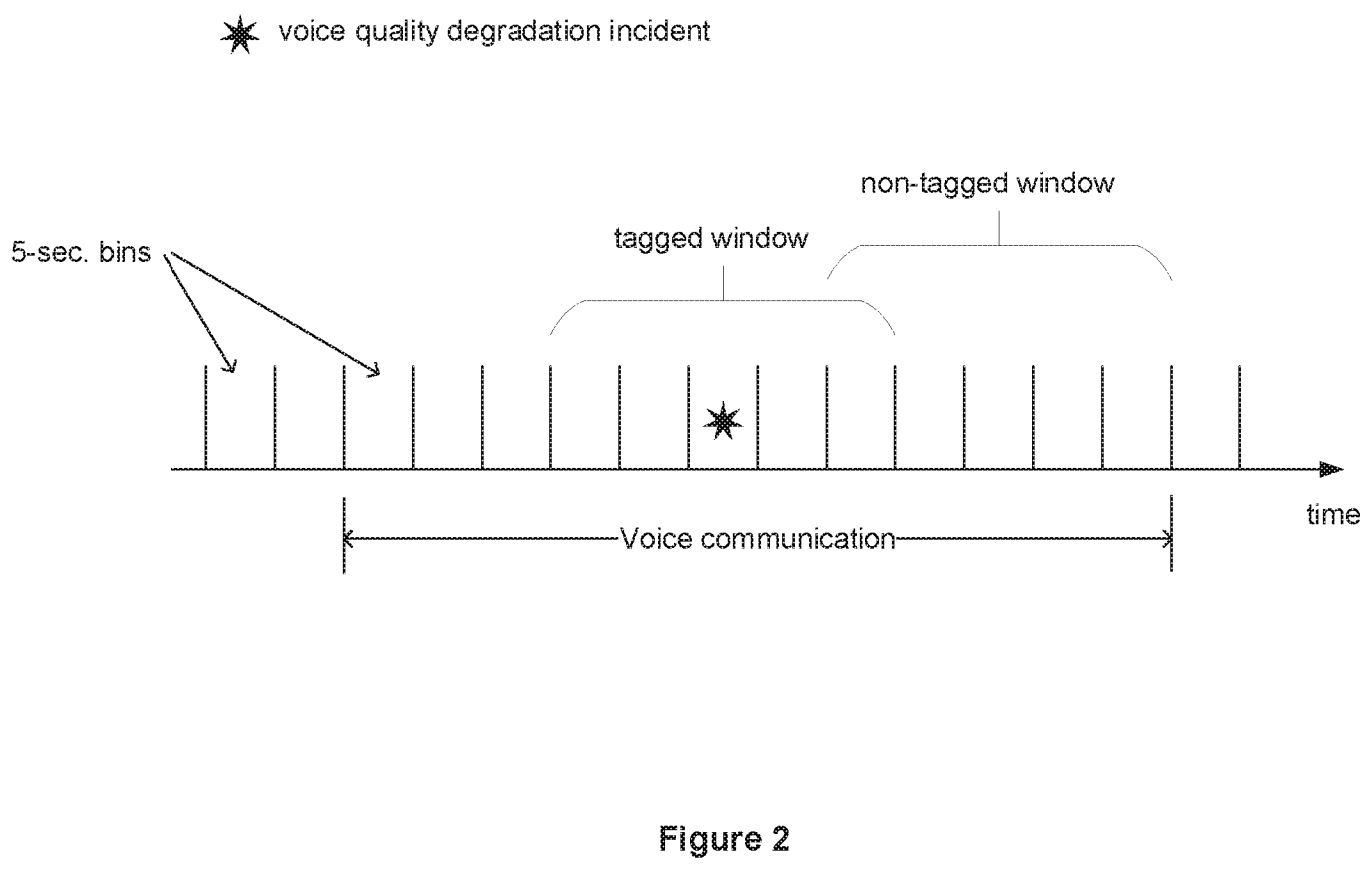

FIG. 2 depicts a timeline of a voice communication. The full RTP flow characteristics are captured and analyzed offline. Because a voice quality degradation incident may occur at any time during a voice communication, each communication analyzed is divided into 5-second intervals, referred to herein as "bins." Those of skill in the art will readily recognize that a different duration could be used to define a bin. Each bin is associated with at least a binary indicator signaling whether or not evidence of a voice quality degradation incident was detected during the 5-second duration defining that bin.

Because control plane signaling immediately prior to, or after, a detected voice quality degradation incident may have predictive value, the two preceding and two succeeding bins are collected together, to form a 5-bin window. Those of skill in the art will readily recognize that a window may comprise a different number of bins. In one embodiment, each bin is the center bin of a different window—that is, multiple windows overlap throughout the voice communication. For short voice communications, and at the beginning and end of a voice communication, bins indicating no voice quality degradation incident are applied as padding.

FIG. 2 depicts a voice communication divided into, e.g., 5-second bins, and the bins grouped into, e.g., 5-bin windows. Windows are "tagged" as containing at least one voice quality degradation incident, or alternatively, being incident-free. In one embodiment, a window is tagged only if the center bin indicates a voice quality degradation incident. In another embodiment, a window may be tagged if any of, say, the three center bins indicate a voice quality degradation incident. In still another embodiment, a window is tagged if any bin at all in the window indicates a voice quality degradation incident. The latter cases are referred to herein as "relaxed timing," and in some cases this improves performance of the machine learning model. Those of skill in the art will readily recognize that a number of different tagging strategies may be advantageously employed.

Features: Control Plane Signaling Patterns

The "features" of a predictive machine learning algorithm corresponds to the variable "x"—they are inputs to the model once it is trained. According to embodiments of the present invention, the control plane signaling patterns in the full, correlated data set that are time-correlated to windows tagged as containing a voice quality degradation incident, are translated to features for training a machine learning model.

Examples of Packet Core control plane signaling patterns include events of creating, deleting, modifying, or updating bearers. Another example is handover events—including both 3GPP and 3GPP-WiFi and intra- or inter-RAT handovers. Specific features may comprise, for example, the number of handovers, their outcome (i.e., successful or failed), and their duration. Further examples include Packet Data Protocol (PDP) context creation, deletion, or update events; session creation or deletion; Protocol Data Unit (PDU) Session establishment, modification, or update. Those of skill in the art will readily recognize that this list is representative only, and is not exhaustive or limiting.

Examples of Cell Trace Record (CTR) control plane signaling patterns include periodic traffic reports, which contain information about packet loss. Another example is uplink and downlink radio link quality measurement reports, such as Channel Quality Indicator (COI) reports from a UE, or Signal to Interference and Noise (SINR) reports or transmission power commands from a base station. Further examples include periodic radio measurement reports, such as Reference Signal Received Power (RSRP), Reference Signal Received Quality (RSRQ), and the corresponding measurement reports for Secondary Synchronization signal (SS-RSRP and SS-RSRQ). Still further examples include mobility evaluation, such as what triggered radio link measurements, and what decision was made based on the measurement; and handover events (as above, this includes information about timing, outcome, handover type, and the like). Those of skill in the art will readily recognize that this list is representative only, and is not exhaustive or limiting.

Training the Machine Learning Model

Using the tagged windows indicating voice quality degradation incidents detected in the user plane media, and corresponding control plane signaling features, a predictive machine learning model is trained to predict user plane voice quality degradation incidents based on real-time control plane signaling. In one embodiment, the set of features used for prediction is iteratively decreased using dimensionality reduction techniques: first feature importance metrics are calculated for the control plane related features, and the least relevant ones are excluded. Then a final machine learning model is trained using only the most important features.

When training a predictive machine learning model, there is always a precision-recall tradeoff. Precision stands for the probability that a predicted voice quality degradation incident is present in reality—low precision results in many "false positives," or false indications that an incident exists when it does not. Recall is the ratio of voice quality degradation incidents correctly predicted by the model, to the total number of voice quality degradation incidents— recall is a measure of accuracy. When trained with "high sensitivity" settings, the machine learning model is able to predict most voice quality degradation incidents, but generates a large number of false positives. On the contrary, "low sensitivity" settings help to avoid false positives, but a significant number of actual voice quality degradation incidents are missed. These sensitivity controls are known in the art for various machine learning algorithms. Many different precision-recall combinations are possible within the broad scope of embodiments of the present invention.

Figure 3:
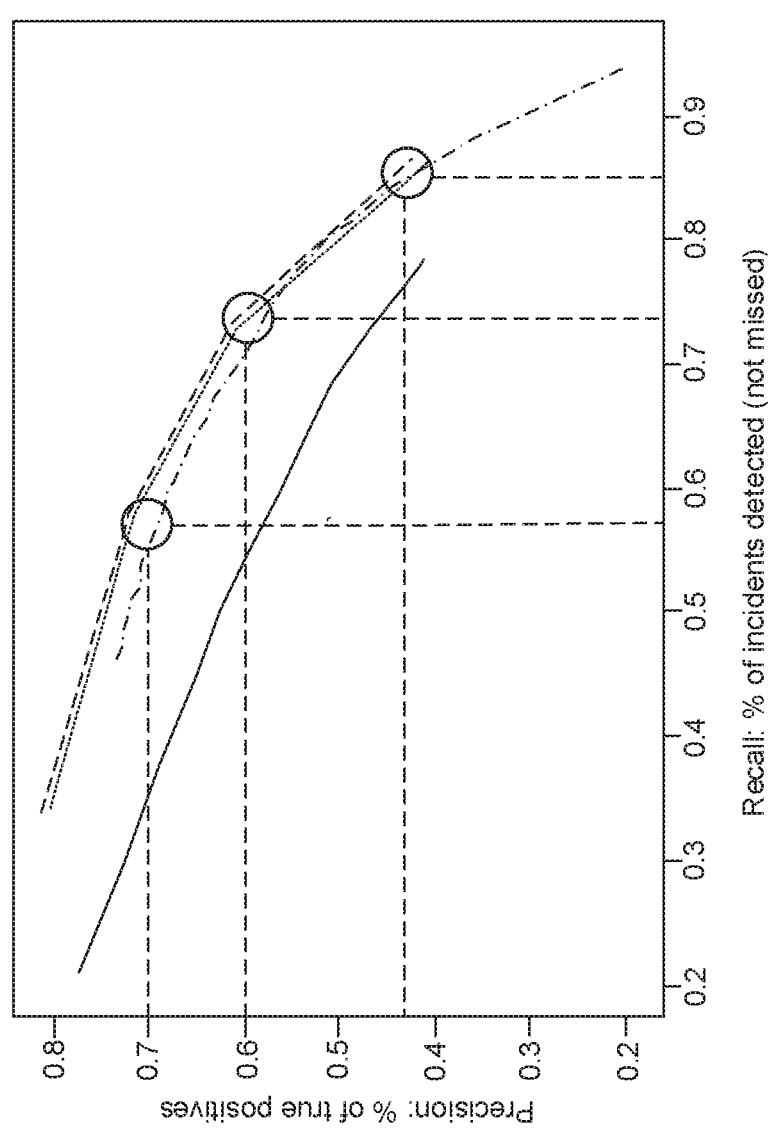
FIG. 3 is a graph depicting results of numerous iterations of training a machine learning model for voice quality monitoring.

FIG. 3 presents the results of voice quality monitoring using numerous different trainings of a predictive machine learning model. The model was trained with data extracted from approximately 100,000 voice communications. Numerous different sources of control plane signaling were used—including packet core signaling only, packet core signaling with relaxed timing constraints, CTR data only, and both packet core signaling and CTR data. As FIG. 3 indicates, the overall best recall was achieved using packet core signaling with relaxed timing constraints, and the best precision was achieved using CTR data (or both CTR data and packet core signaling, which performed surprisingly close to CTR data alone). Three different tradeoff points are identified: ~57% of voice quality degradation incidents detected with 70% true positive rate; ~73% of incidents detected with 60% true positive rate; and ~85% of incidents detected with a 45% true positive rate.

Based on these results, CTR data appears to yield good results, and adding packet core control plane signaling does not significantly improve these results. Also, packet core signaling alone is slightly less accurate, but still viable for effective voice quality monitoring, with a proper machine learning model. Relaxing the timing constraints—i.e., for training labels, tagging a window that includes a detected voice quality degradation incident in any bin—improves performance considerably.

Voice Quality Monitoring

Figure 4:
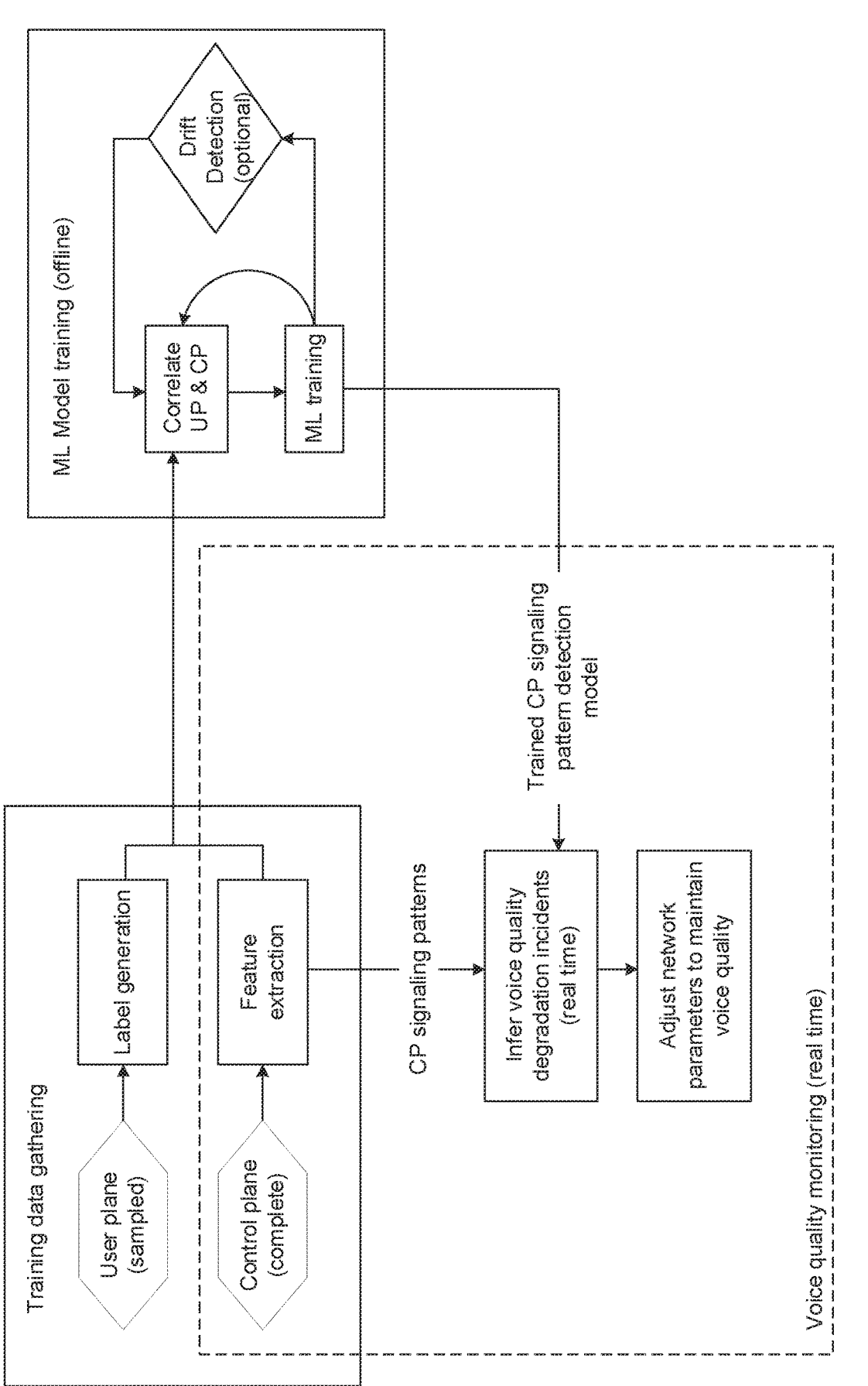
FIG. 4 is a block diagram showing phases of the process of voice quality monitoring.

FIG. 4 depicts the overall process of voice quality monitoring, according to embodiments of the present invention. Initially, training data is gathered from ongoing voice communications in the network (or portion of a network) to be monitored. Both the user plane media (at least a significant sampling) and control plane signaling (complete) are gathered from actual voice communications. Labels are generated based on voice quality degradation incidents detected from events in the RTP media flow in the user plane. Windows are defined and tagged, as described above. Features comprising control plane signaling events are extracted from the control plane signaling (e.g., CTR data or packet core signaling).

In an offline process, where computational complexity is not a constraint, the control plane events are time-correlated to the tagged windows of voice communications in the user plane data. As described above, the time constraints of the correlation may be relaxed by the selected window tagging strategy, which may improve model performance in some embodiments. A predictive machine learning model is then trained using the labels and features of the correlated data. Because network operation is dynamic, and user traffic patterns change both throughout the day and over longer timeframes, an optional drift detection mechanism may trigger retraining of the ML model, based on more recently-acquired user plane and associated control plane signaling data. Alternatively, or additionally, retraining may be performed periodically, following major network upgrades or reconfigurations, and the like. The machine learning training process yields a trained model that detects control plane signaling patterns, and predicts voice quality degradation incidents in user plane voice communications in response to the control plane signaling patterns.

After the machine learning model has been trained, it is utilized in a real-time process of ongoing wireless communication network voice quality monitoring. Control plane signaling is monitored and features, comprising control plane signaling events, are extracted. These control plane signaling pattern features are applied to the trained machine learning model, which infers the presence of voice quality degradation incidents in user plane traffic, from the control plane signaling patterns. Network operators can then adjust network parameters, change resource allocations, limit access, or take other actions to ensure that voice quality meets required metrics.

FIG. 5 depicts the steps in a method 100 of monitoring voice quality in a wireless communication network implemented with separate user plane and control plane architectures. The method 100 is performed in real time as voice communications are transmitted through the network. Control plane signaling, for all voice communications over at least a first portion of the wireless communication network, is monitored (block 102). Features are extracted from the control plane signaling (block 104). Voice quality degradation incidents in the user plane media are inferred by applying the features to a previously trained machine learning model that predicts voice quality degradation incidents based on the control plane signaling features (block 106).

Apparatus

Figure 6:
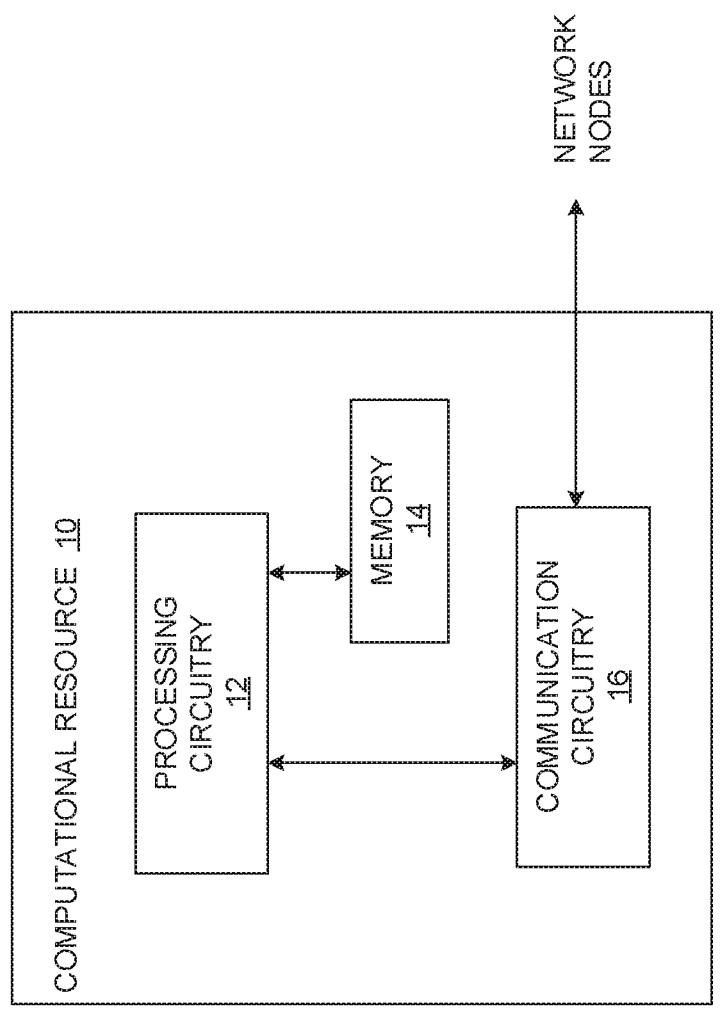
FIG. 6 is a block diagram of a network node.

FIG. 6 is a block diagram of a computational resource 10. In one embodiment, the computational resource 10 is a wireless communication network node and may, for example, comprise any of the nodes in the packet core or RAN of FIG. 1. In another embodiment, the computational resource 10 is external to the wireless communication network, and may for example comprise a virtualized server in a data center, such as in the so-called cloud. Embodiments of the present invention are agnostic as to their location within, or external to, the network, and also as to the underlying hardware executing them. Those of skill in the are will recognize that, so long as the it has real time (or near-real-time) access to control plane signaling, the computational resource 10 could be realized in many different forms. However implemented, the computational resource 10 includes processing circuitry 12 operatively coupled to memory 14 (those of skill in the art will recognize that the memory 14 may reside within the processing circuitry 12). The processing circuitry 12 is further operatively coupled to communication circuitry 16. The communication circuitry 16 is configured to communicate, directly or indirectly, with one or more wireless communication network nodes, such as any of the nodes depicted in FIG. 1. The memory 14 is configured to store, and the processing circuitry 12 is configured to execute, software operative to cause the processing circuitry 12 to perform the method 100, as well as other computational tasks.

The processing circuitry 12 may comprise any sequential state machine operative to execute machine instructions stored as machine-readable computer programs in memory 14, such as one or more hardware-implemented state machines (e.g., in discrete logic, FPGA, ASIC, etc.); programmable logic together with appropriate firmware; one or more stored-program, general-purpose processors, such as a microprocessor or Digital Signal Processor (DSP), together with appropriate software; or any combination of the above.

The memory 14 may comprise any machine-readable media known in the art or that may be developed, including but not limited to magnetic media (e.g., floppy disc, hard disc drive, etc.), optical media (e.g., CD-ROM, DVD-ROM, etc.), solid state media (e.g., SRAM, DRAM, DDRAM, ROM, PROM, EPROM, Flash memory, solid state disc, etc.), or the like.

The communication circuitry 16 may comprise a receiver and transmitter interface used to communicate with one or more network nodes according to one or more communication protocols known in the art or that may be developed, such as Ethenet, TCP/IP, SONET, ATM, SIP, or the like. Additionally or alternatively, the communication circuitry 16 may establish wired or wireless communication with non-network hardware, such as a data center in the cloud, e.g., via WiFi, Bluetooth, an Internet connection, or the like.

In general, the processing circuitry 12, memory 14, and communication circuitry 16 are well known in the art. Furthermore, details of these circuits are not critical to embodiment of the present invention, which may be implemented on any appropriate computational hardware. Accordingly, the hardware is not further described herein.

To perform the method 100, the computational resource 10 must at least obtain control plane signaling for voice communications. When implemented as a network node, the computational resource 10 (or a network function or application function executing thereon) may obtain control plane signaling directly from other network nodes, such as those indicated in FIG. 1. Alternatively, the computational resource 10 (whether implemented as a network node or a computing resource outside the network) may access network monitoring services and/or subscriptions.

In some embodiments, the processing circuitry 12 of the computational resource 10 may further perform the offline function of training the predictive machine learning model. However, in some embodiments, this function may be performed by different computational circuitry such as at a data center or in the cloud. Such computational circuitry may have a structure or architecture fundamentally similar to that depicted in FIG. 6.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Representative Control Plane Signaling Relevant to Voice Quality

The machine learning model discovers control plane signaling patterns that are typically correlated with voice quality degradation incidents. Such patterns dynamically change with protocols or network nodes, and might be different from network to network due to complex multivendor scenarios or different network optimization settings. Hence, embodiments of the present invention dynamically create a machine learning model to predict voice quality degradation incidents, and ensure dynamic adaptation of the machine learning model using a periodic or triggered re-training. The focus of embodiments of the invention is therefore not to list a set of static rules based on the control plane event patterns discovered in any given implementation of network data.

However, for illustrative purposes, some control plane signaling patterns are listed below that were leaned by the machine learning model as being indicative of voice quality degradation incidents in user plane voice communications. While the model detected a wide variety of control plane signaling patterns, some of the more significant include:

Failed handovers during the voice communication. This is typical, and was easily discovered by the machine learning model.

Bearer modifications and the existence of nearby handovers. The machine learning model was able to identify the conditions when bearer modifications indicated voice quality degradation incidents.

Successful, but long handover processes. The trained machine learning model discovered the relationship between handover duration and voice quality degradation incident probability. While this seems intuitive, defining a threshold value for handover duration to indicate voice quality consequences would be highly questionable.

Multiple attempted handovers before success. Again, having a hardcoded threshold for the number of handover attempts is not viable; however, the machine learning model takes into account the "context," i.e., other nearby control plane signaling events, and indicates voice quality degradation incidents accordingly.

Successful and fast, but repetitive handovers (suspected "ping-pong" effect). It is not surprising that this control plane signaling pattern might cause voice quality implications; this was verified by the machine learning model.

Advantages of Embodiments of the Present Invention

Embodiments of the present invention present numerous advantages over voice quality monitoring methods and systems known in the art. Embodiments described herein achieve an optimized balance between resource requirements (hardware footprint) and level of detail for analytics by inferring user plane quality degradation incidents based on known/actual control plane signaling patterns. Compared to random sampling, which requires extrapolation to the full, non-sampled traffic, more robust information is obtained from the control plane, therefore full coverage of user plane monitoring is maintained, with a controlled level of uncertainty due to the accuracy of the machine learning model. Compared to full coverage user plane probing, significant hardware footprint reduction is achieved, as the real time monitoring requires only control plane signaling (which is typically provided even by simple network analytics tool); while training of the machine learning model occurs offline on a collected sample of correlated user plane—control plane data, without the real-time pressure. The predictive machine learning model is trained in the actual network to be subsequently monitored; there is no need for pre-defined static rules. Adaptation to the changing network conditions is inherently part of the system through periodic re-training, as the offline sampling & training process might be running as a resource constrained background process.

Definitions

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein. As used herein, the term "configured to" means set up, programmed, organized, adapted, or arranged to operate in a particular way; the term is synonymous with "designed to." As used herein, the term "substantially" means nearly or essentially, but not necessarily completely; the term encompasses and accounts for mechanical or component value tolerances, measurement error, random variation, and similar sources of imprecision.

As used herein, the term "control plane signaling" refers to network traffic in the control plane architecture—that is, signaling that controls, monitors, or manages the operation of the network. As used herein, the term "user plane media" refers to network traffic in the user plane architecture—that is, network traffic that carries voice or data to or from a network subscriber. As known in the art, control plane signaling and user plane media may refer to activity at network nodes, or communication on links between network nodes. As used herein, the term "voice quality degradation incident" means any incident of degraded or reduced-quality voice communications in the network, as measured by an appropriate metric, such as MOS. Voice quality degradation incidents include, but are not limited to, garbled voice, muted voice, gaps in the voice communication, repetitions (echoes), and the like. As used herein, the term "control plane signaling patterns" refers to events and patterns of control plane signaling extracted as features to train and operate a machine learning model correlating control plane signaling to labels comprising voice quality degradation incidents detected in user plane media. Control plane signaling events and patterns include, but are not limited to, failed handovers, bearer modifications, the existence of nearby handovers, successful but long handovers, multiple attempted handovers before a successful one, successful but repetitive handovers, and the like. As used herein, a "portion" of a wireless communication network means a subset of the network, up to and including the entire network. For example, a first portion of a wireless communication network may refer to a subset of nodes of a core network and one or more cells.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

What is claimed is:

1. A method of monitoring voice quality in a wireless communication network implemented with separate user plane and control plane architectures, comprising, in real time as voice communications are transmitted through the network:

monitoring control plane signaling for all voice communications over at least a first portion of the wireless communication network;

extracting features from the control plane signaling; and inferring voice quality degradation incidents in the user plane media by applying the features to a previously trained machine learning model that predicts voice quality degradation incidents based on the control plane signaling features.

2. The method of claim 1 wherein the machine learning model was trained using a predetermined sensitivity setting that adjusts a precision/recall trade-off between a number of voice quality degradation incidents correctly inferred and a number of false positive inferences of voice quality degradation incidents.

3. The method of claim 1 further comprising adjusting one or more network parameters in response to the number of inferred voice quality degradation incidents.

4. The method of claim 1 further comprising, prior to the monitoring, extracting, or inferring steps, and in an offline process that does not occur in real time, training a machine learning model by:

obtaining user plane and control plane signaling for a plurality of voice communications over the first portion of the wireless network;

for each voice communication:

temporally dividing the voice communication into a plurality of windows;

analyzing a Real-time Transport Protocol media flow of the user plane media to determine voice quality degradation incidents; and tagging each window that contains a voice quality degradation incident; and training a predictive machine learning model wherein, for each window of each voice communication, a label is a tag indicating whether the window contains a voice quality degradation incident, and features are control plane signaling events time-correlated to the window;

whereby the trained machine learning model predicts user plane voice quality degradation incidents based on control plane signaling event features.

5. The method of claim 4 wherein temporally dividing the voice communication into a plurality of windows comprises:

temporally dividing the voice communication into a plurality of bins; and wherein each window comprises a predetermined, odd number of contiguous bins.

6. The method of claim 5 wherein the windows overlap such that each bin is the center bin of a unique window, and further comprising padding, as necessary, short voice communications and the beginning and end of each voice communication with bins indicating no voice quality degradation incident.

7. The method of claim 5 wherein tagging each window that contains a voice quality degradation incident comprises tagging only the windows that contain a voice quality degradation incident in the center bin of the window.

8. The method of claim 5 wherein tagging each window that contains a voice quality degradation incident comprises tagging the windows that contain a voice quality degradation incident in any of a predetermined number of center-most bins of the window.

9. The method of claim 4 wherein control plane signaling events corresponding to the window comprise packet core control plane signaling events time-correlated to the window.

10. The method of claim 4 wherein control plane signaling events corresponding to the window comprise cell trace record events time-correlated to the window.

11. A computational resource communicatively coupled to a wireless communication network implemented with separate user plane and control plane architectures, and operative to monitor voice communications in the wireless communication network, comprising:

communication circuitry; and processing circuitry operatively coupled to the communication circuitry and configured to, in real time as voice communications are transmitted through the network:

monitor control plane signaling for all voice communications over at least a first portion of the wireless communication network;

extract features from the control plane signaling; and infer voice quality degradation incidents in the user plane media by applying the features to a previously trained machine learning model that predicts voice quality degradation incidents based on the control plane signaling features.

12. The resource of claim 11 wherein the machine learning model was trained using a predetermined sensitivity setting that adjusts a precision/recall trade-off between a number of voice quality degradation incidents correctly inferred and a number of false positive inferences of voice quality degradation incidents.

13. The resource of claim 11 wherein the processing circuitry is further configured to adjust one or more network parameters in response to the number of inferred voice quality degradation incidents.

14. The resource of claim 11 wherein the processing circuitry is further configured to, prior to monitoring, extracting, or inferring, and in an offline process that does not occur in real time, train a machine learning model by:

obtaining user plane and control plane signaling for a plurality of voice communications over the first portion of the wireless network;

for each voice communication:

temporally dividing the voice communication into a plurality of windows;

analyzing a Real-time Transport Protocol media flow of the user plane media to determine voice quality degradation incidents; and tagging each window that contains a voice quality degradation incident; and training a predictive machine learning model wherein, for each window of each voice communication, a label is a tag indicating whether the window contains a voice quality degradation incident, and features are control plane signaling events time-correlated to the window;

whereby the trained machine learning model predicts user plane voice quality degradation incidents based on control plane signaling event features.

15. The resource of claim 14 wherein the processing circuitry is configured to temporally divide the voice communication into a plurality of windows by:

temporally dividing the voice communication into a plurality of bins; and wherein each window comprises a predetermined, odd number of contiguous bins.

16. The resource of claim 15 wherein the windows overlap such that each bin is the center bin of a unique window, and wherein the processing circuitry is further configured to pad, as necessary, short voice communications and the beginning and end of each voice communication with bins indicating no voice quality degradation incident.

17. The resource of claim 15 wherein the processing circuitry is configured to tag each window that contains a voice quality degradation incident by tagging only the windows that contain a voice quality degradation incident in the center bin of the window.

18. The resource of claim 15 wherein the processing circuitry is configured to tag each window that contains a voice quality degradation incident by tagging the windows that contain a voice quality degradation incident in any of a predetermined number of center-most bins of the window.

19. The resource of claim 14 wherein control plane signaling events time-correlated to the window comprise packet core control plane signaling events time-correlated to the window.

20. The resource of claim 14 wherein control plane signaling events time-correlated to the window comprise cell trace record events time-correlated to the window.

* * * * *